(12) United States Patent
Sagarwala et al.

(10) Patent No.: US 9,735,571 B2
(45) Date of Patent: Aug. 15, 2017

(54) N+1 POWER SUPPLY SYSTEM UPGRADE USING DUAL OUTPUT POWER SUPPLIES

(71) Applicant: Juniper Networks, Inc., Sunnyvale, CA (US)

(72) Inventors: Muhammad Sagarwala, Los Gatos, CA (US); Thomas Alexander, Palo Alto, CA (US); Jaspal S. Gill, Tracy, CA (US); Michael Braylovskiy, San Mateo, CA (US); Cynthia Wang, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 582 days.

(21) Appl. No.: 14/266,225

(22) Filed: Apr. 30, 2014

(65) Prior Publication Data

US 2014/0245035 A1    Aug. 28, 2014

Related U.S. Application Data

(62) Division of application No. 12/979,001, filed on Dec. 27, 2010, now Pat. No. 8,742,624.

(51) Int. Cl.
*H02J 1/10* (2006.01)
*H02J 1/00* (2006.01)
*G06F 1/26* (2006.01)

(52) U.S. Cl.
CPC ............ *H02J 1/00* (2013.01); *G06F 1/26* (2013.01); *H02J 1/10* (2013.01); *H02J 1/102* (2013.01); *Y10T 307/50* (2015.04); *Y10T 307/707* (2015.04)

(58) Field of Classification Search
CPC ........................................ H02J 1/10
USPC ................................................ 307/82
See application file for complete search history.

(56) References Cited

U.S. PATENT DOCUMENTS

| 5,289,359 | A | * | 2/1994 | Ziermann | H02M 3/33507 363/21.05 |
|---|---|---|---|---|---|
| 5,627,459 | A | * | 5/1997 | Itoyama | G05F 1/565 323/283 |
| 6,683,441 | B2 | | 1/2004 | Schiff et al. | |
| 7,243,248 | B1 | * | 7/2007 | Roux | G11B 33/12 711/114 |

(Continued)

OTHER PUBLICATIONS

Co-pending U.S. Appl. No. 12/979,001, by Muhammad Sagarwala et al., entitled "N+1 Power Supply System Upgrade Using Dual Output Power Supplies", filed Dec. 27, 2010.

*Primary Examiner* — Adi Amrany
(74) *Attorney, Agent, or Firm* — Harrity & Harrity, LLP (57) ABSTRACT

A system may include a power module that includes a group of power supplies, particular ones of the group of power supplies being operable at a group of voltages ranging from a first voltage to a second voltage. The system may further include a controller coupled to the particular ones of the group of power supplies, the controller being to ramp up an output voltage, associated with the group of power supplies, from the first voltage to the second voltage in a group of discrete steps; where ramping up the output voltage by a particular one of the group of discrete steps is performed while a load is receiving power from the group of power supplies; and where ramping up the output voltage by a particular one of the group of discrete steps prevents overcurrent protection on the group of power supplies from being activated.

20 Claims, 7 Drawing Sheets

(56) References Cited

U.S. PATENT DOCUMENTS

| | | |
|---|---|---|
| 7,522,435 B2 | 4/2009 | Kohnotoh et al. |
| 8,067,857 B2 | 11/2011 | Humphrey et al. |
| 8,106,538 B2 | 1/2012 | Kunow et al. |
| 8,143,851 B2 | 3/2012 | Greening et al. |
| 8,179,100 B2 | 5/2012 | Vogel |
| 8,212,410 B2 | 7/2012 | Biester et al. |
| 8,338,988 B2 * | 12/2012 | Togare ................ G06F 1/263 307/85 |
| 8,390,226 B1 * | 3/2013 | Krishnamoorthy ....... H02P 6/08 318/400.16 |
| 8,421,929 B2 | 4/2013 | Joo et al. |
| 2003/0042971 A1 * | 3/2003 | Oikawa .................. G05F 1/56 327/540 |
| 2007/0024261 A1 * | 2/2007 | Wong ................ H02M 3/1588 323/288 |
| 2008/0174179 A1 * | 7/2008 | Hirahara .............. H03F 1/0222 307/75 |
| 2009/0073731 A1 | 3/2009 | Phadke et al. |
| 2009/0153114 A1 * | 6/2009 | Huang ............... H02M 3/1584 323/282 |
| 2009/0208824 A1 | 8/2009 | Greening et al. |
| 2009/0305087 A1 | 12/2009 | Rajashekara et al. |
| 2010/0164292 A1 * | 7/2010 | Freeman ............... G06F 1/263 307/80 |
| 2010/0308661 A1 | 12/2010 | Garcia et al. |
| 2011/0096242 A1 | 4/2011 | Joo et al. |

\* cited by examiner

| POWER SUPPLY #1 | SET VOLTAGE OF POWER SUPPLY #1 | MEASURED VOLTAGE OF POWER SUPPLY #1 |
|---|---|---|
| ⋮ | ⋮ | ⋮ |
| POWER SUPPLY #(N+1) | SET VOLTAGE OF POWER SUPPLY #(N+1) | MEASURED VOLTAGE OF POWER SUPPLY #(N+1) |
| OLD OPERATING VOLTAGE OF SYSTEM 570 | CURRENT SET VOLTAGE OF SYSTEM 580 | NEW OPERATING VOLTAGE OF SYSTEM 590 |

N+1 POWER SUPPLY SYSTEM UPGRADE USING DUAL OUTPUT POWER SUPPLIES

RELATED APPLICATION

This application is a divisional of U.S. patent application Ser. No. 12/979,001, filed Dec. 27, 2010, the disclosure of which is incorporated herein by reference.

BACKGROUND

Increasing use of data intensive services, such as video streaming, voice over Internet Protocol (VoIP), and wireless telephony has led to an unanticipated rate of growth in internet traffic. The rate of growth of internet traffic may cause manufacturers of networking equipment to design networking equipment, such as switches or routers, capable of handling higher transmission rates and larger bandwidths. As network devices handle higher transmission speeds, the network devices may consume more power. For example, total power consumptions of network devices, such as line cards, may be proportional to transmission rate. One method of meeting power consumption requirements of new network devices may include complete replacement of an old system with a new system capable of handling a higher power requirement. However, this may not be practical or economical. Therefore, keeping up with the power requirements of networking equipment may prove to be particularly challenging.

SUMMARY OF THE INVENTION

According to one aspect, a system may include a power module that includes a group of power supplies, particular ones of the group of power supplies being operable at a group of voltages ranging from a first voltage to a second voltage; and a controller coupled to the particular ones of the group of power supplies, the controller being to ramp up an output voltage, associated with the group of power supplies, from the first voltage to the second voltage in a group of discrete steps; where ramping up the output voltage by a particular one of the group of discrete steps is performed while a load is receiving power from the group of power supplies; and where ramping up the output voltage by a particular one of the group of discrete steps prevents overcurrent protection on the group of power supplies from being activated.

According to another aspect, a method may include activating a particular power supply, the particular power supply being part of a power module comprising a group of power supplies; determining whether the power module is running at a new voltage, where the power module is to be upgraded from an old voltage to the new voltage; determining whether the power module includes enough power supplies to supply power to a group of devices at the new voltage, when the power module is not running at the new voltage; performing a stepwise ramp up process, from the old voltage to the new voltage, on the particular power supply, when the power module includes enough power supplies to supply power to the group of devices at the new voltage; and ramping up the particular power supply from the old voltage to the new voltage in one step, when the power module is running at the new voltage.

According to yet another aspect, a power supply may include a direct current (DC) power stage to convert an input DC voltage into an output DC voltage; a resistive divider, coupled to the DC power stage, to control the output DC voltage, where the resistive divider includes a digital potentiometer; a slave controller to receive a command from a controller, the command specifying the output DC voltage; determine a setting of the digital potentiometer based on the received command; and set the digital potentiometer to the determined setting.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention.

Chassis based communication equipment may be designed with a set limit on the amount of power that can be provided to line cards and/or fabric cards. The set limit may dictate the amount of copper on the backplane as well as the rating of connectors. The current ratings may be based on assumptions of future power consumption, which may turn out to be inadequate. Equipment may be upgraded to a higher capacity power supply system by adding power supplies with a same voltage as the power supplies in the existing system. However, this may lead to current drawn from the power supply system growing proportionally to output power, thereby creating additional load on the entire system and exceeding the current ratings of the copper and/or connectors. Adding power supplies with a set higher voltage may avoid this problem. However, it may not be possible to add a power supply with a set higher voltage without turning off the system, leading to an interruption of service.

A chassis based communication equipment may be based on a power supply redundancy model to ensure continuing operation if a particular power supply fails. One approach, known as N+N, entails the use of N active power supplies and N backup power supplies. However, the use of N backup power supplies may be wasteful and inefficient, as half the power supplies are in standby mode while consuming space and leaking power, while costing twice as much as necessary to power the chassis.

A more efficient approach may include the use of N+1 active power supplies, which means that all N+1 power supplies are active, but only N power supplies are necessary to provide sufficient power and one power supply is redundant. Thus, in an N+1 system, one power supply can fail without loss of power. However, hot upgrading of an N+1 power supply system may be challenging. Power supplies in an N+1 system may share current, which means that the output voltage of all the power supplies may need to be set very close to each other, as any difference in voltage from a particular power supply may result in an imbalance of current from the particular power supply. For example, if a new power supply is added and operated at a new higher voltage, while the other power supplies are operating at an existing lower voltage, the new power supply may try to provide all the power to the system, leading to an oversupply of current, activation of over-current protection, and shutdown of the system.

An implementation described herein may relate to upgrading a power supply system using power supplies with a dual voltage range. A power supply with a dual voltage range may be able to operate at an old voltage and at a new voltage. The power supply may be adjustable from the old voltage to a new voltage in sufficiently small steps so that the voltage may be slowly bumped up from the old voltage to the new voltage. Power supplies in an N+1 power supply may be replaced (e.g., hot-swapped) one by one while the system is in operation. A power supply with an adjustable output voltage may include a resistive divider that includes a digital potentiometer with a wiper input connected to a controller. The controller may include an input bus that accepts a command to ramp up the voltage and may convert the command into a setting of the digital potentiometer.

Once power supplies are replaced with new power supplies with higher voltage capacity, the power supply system may be gradually ramped up to the new voltage. For example, in a system with an old operating voltage of 48 V and a new operating voltage of 58 V, the power supply system may be gradually ramped up in 0.5-0.8 V increments. A central controller may control the voltage increments and may pause after a voltage increment for a particular length of time (e.g., 4-5 seconds) and may poll the power supplies to make sure the power supplies are operating at a same voltage. If a particular power supply is found to be discrepant by operating at a different voltage, the voltage of the discrepant power supply may be adjusted before a next voltage increment is performed. Increasing the voltage in discrete small steps may allow a system to be brought to a new operating voltage while the system is in operation, while ensuring that all power supplies are drawing a substantially same amount of current. This may prevent a power supply system from going into over-current protection and shutting down, thus allowing the system to be upgraded to a new operating output voltage without interruption of service.

Figure 1:
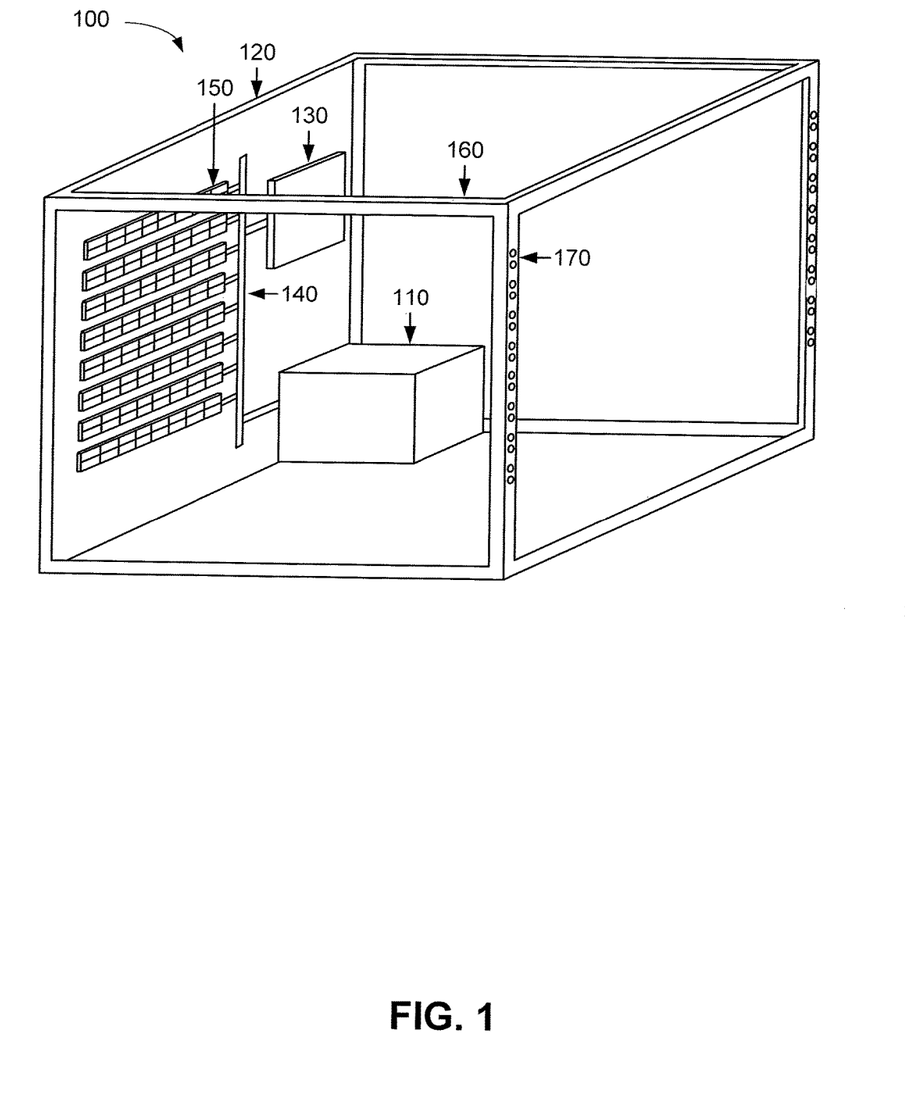
FIG. 1 is a diagram illustrating an example system according to an implementation described herein.

FIG. 1 is a diagram illustrating an example rack system 100 according to an implementation described herein. In order to illustrate example components of rack system 100, FIG. 1 depicts rack system 100 as an empty chassis without any installed line cards and/or fabric cards. Rack system 100 may supply power to line cards and/or fabric cards, provide structural stability for line cards and/or fabric cards mounted in rack system 100, may provide a space-efficient way to store and organize line cards and/or fabric cards, may provide EM shielding for the line cards and/or fabric cards, and may provide a mechanism that allows communications between individual line cards and/or fabric cards. As shown in FIG. 1, rack system 100 may include a power module 110, a backplane 120, and a chassis frame 160.

Power module 110 may supply power to backplane 120 and/or to any line cards and/or fabric cards installed in rack system 100. Power module 110 may include one or more power supplies. For example, power module 110 may include N+1 power supplies, where N corresponds to the number of active power supplies necessary for operation of rack system 110 (e.g., to supply sufficient power to backplane 120 and all installed line cards and/or fabric cards). In an N+1 system, all N+1 power supplies are active, but one power supply is allowed to fail. Example components of power module 110 are described below with reference to FIG. 2.

Backplane 120 may be mounted on a back surface of chassis frame 160. Backplane 120 may include a central controller 130, a bus 140, and one or more connectors 150. Central controller 130 may control operation of backplane 120 and its components and may control operation of power module 110. For example, central controller 130 may control ramping up operation of power module 110 from an existing lower output voltage to a new and higher output voltage. Bus 140 may electrically connect to power module 110, to central controller 130, and to connectors 150. Bus 140 may allow power module 110 to supply power to backplane 120 and to any installed line cards and/or fabric cards and may allow communication between particular installed line cards and/or fabric cards. Bus 140 may further allow central controller 130 to communicate with power module 110. Connectors 150 may electrically connect particular line cards to backplane 120.

Chassis frame 160 may provide structural stability to rack system 100 and may hold individual line cards and/or fabric cards in place. Chassis 160 may include mounting area 170. Mounting area 170 may include, for example, holes that may accommodate screws used to mount particular line cards and/or fabric cards. Chassis frame 210 may include panels that cover the top, bottom, and sides of rack system 100 (not shown in FIG. 1), to provide additional structural stability to rack system 100, protect line cards from the outside environment, to provide electromagnetic shielding of line cards, to give rack system 100 a more esthetic appearance, etc.

Although FIG. 1 shows example components of rack system 100, in other implementations, rack system 100 may include fewer components, different components, differently arranged components, or additional components than depicted in FIG. 1. Additionally or alternatively, one or more components of rack system 100 may perform the tasks described as being performed by one or more other components of rack system 100. For example, while central controller 130 is illustrated as being installed on backplane 120, in another implementation, central controller 130 may be installed on a particular line card or on a particular fabric card.

Figure 2:
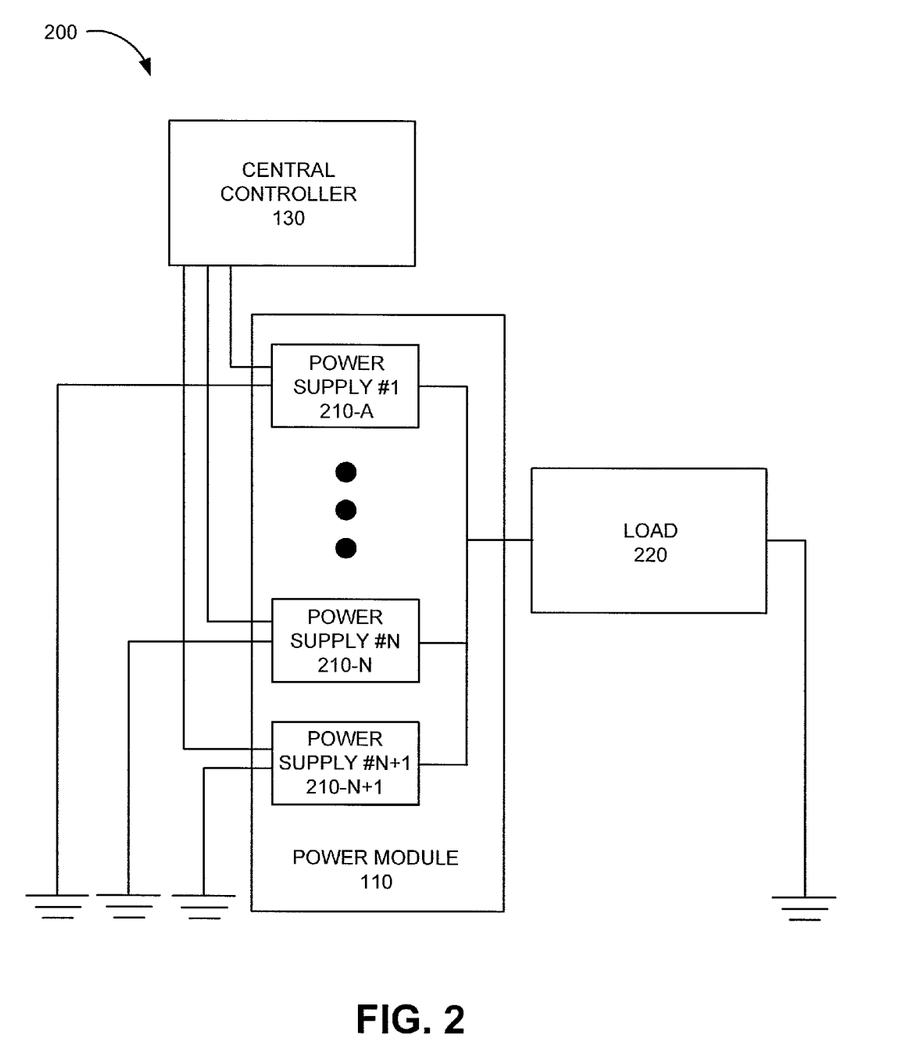
FIG. 2 is a diagram illustrating an example central controller and a power module according to an implementation described herein.

FIG. 2 illustrates a power supply system 200 that illustrates in more detail particular aspects of rack system 100. As shown in FIG. 2, power supply system 200 may include power module 110, central controller 130, and a load 220. Power module 110 may include one or more power supplies 210 (referred to herein collectively as "power supplies 210" and individually as "power supply 210"). For example, power module 110 may include N+1 power supplies 210-A through 210-(N+1), where N represents the number of power supplies necessary to supply sufficient power to load 220.

Load 220 may include, for example, backplane 120 and/or any line cards and/or fabric cards installed onto chassis frame 160 and connected to backplane 120 via connectors 150. As shown in FIG. 2, central controller 130 may include a connection to each power supply 210 to allow central controller 130 to individually control each power supply 210. For example, central controller 130 may set a particular power supply 210 to a particular voltage and/or may poll a particular power supply 210 to determine an output voltage of the particular power supply.

Although FIG. 2 shows example components of power supply system 200, in other implementations, power supply system 200 may include fewer components, different components, differently arranged components, or additional components than depicted in FIG. 2. Additionally or alternatively, one or more components of power supply system 200 may perform the tasks described as being performed by one or more other components of power supply system 200.

Figure 3:
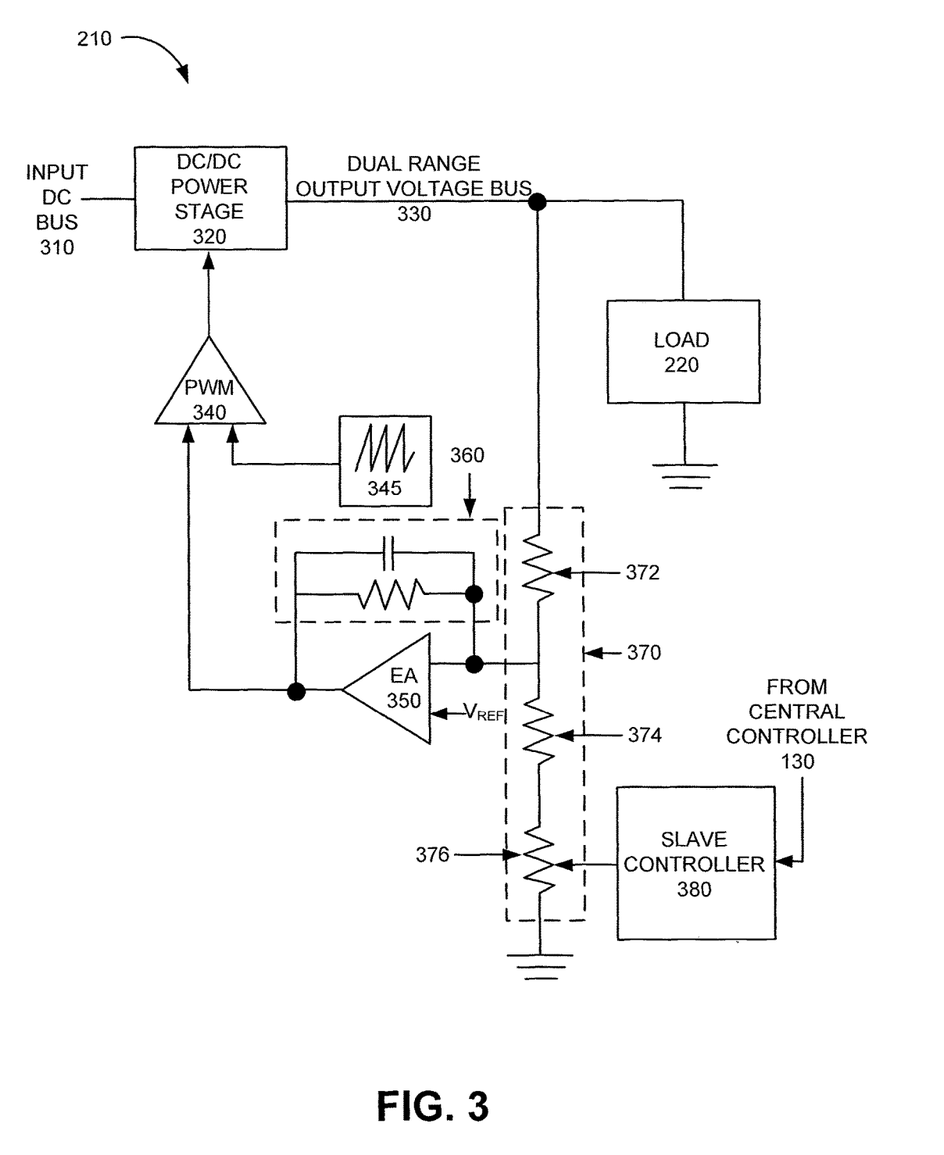
FIG. 3 is a diagram illustrating example components of a power supply according to a first implementation described herein.

FIG. 3 illustrates example components of power supply 210. As shown in FIG. 3, power supply 210 may include an input direct current (DC) bus 310, a DC/DC power stage 320, a dual range output voltage bus 330, a pulse width modulator 340, a sawtooth wave generator 345, an error amplifier 350, a compensation circuit 360, a resistive divider 370, and a slave controller 380.

Input DC bus 310 may provide power from an external DC power source or from an alternating current (AC) to DC converter. DC/DC power stage 320 may convert electrical signals from input DC bus 310 from an input voltage to a set output voltage. Output voltage generated by DC/DC power stage 320 may be controlled using pulse width modulator 340. Dual range output voltage bus 330 may provide the output voltage generated by DC/DC power stage 320 to load 220. Dual range output voltage bus 330 may also connect to resistive divider 370.

Pulse width modulator 340 may combine inputs from sawtooth wave generator 345 and error amplifier 350 to generate a signal to control DC/DC power stage 230. Sawtooth wave generator 350 may generate a waveform with a sawtooth shape. Pulse width modulator 340 may compare the generated sawtooth waveform with the output of error amplifier 350 to generate a pulse signal. The duty cycle of the generated pulse signal may be proportional to the output voltage generated by error amplifier 350.

Error amplifier 350 may take, as one of its inputs, a combination of a signal taken from resistive divider 370 and compensation circuit 360 and, as the other one of its inputs, a reference voltage signal ($V_{REF}$). Compensation circuit 360 may add stability to error amplifier 350 and may compensate for any oscillations. The input received from resistive divider 370 may generate a constant voltage based on the values of resistors included in resistive divider 370.

Resistive divider 370 may include a first resistor 372, a second resistor 374, and a digital potentiometer 376. Resistive divider may provide a constant voltage to error amplifier 350 based on the values of first resistor 372, second resistor 374, and digital potentiometer 376. Values of first resistor 372 and second resistor 374 may be selected to generate a voltage, as an input to error amplifier 350, corresponding to an old voltage output of DC/DC power stage 320 (e.g., corresponding to 48 V in an example where the voltage is to be ramped up from 48 V to 58 V). The resistance of digital potentiometer 376 may be adjustable, by slave controller 380, to change the voltage applied as an input to error amplifier 350 from an old voltage output to a new voltage output in discrete steps.

Slave controller 380 may receive a command from central controller 130 and may convert the received command into a setting of digital potentiometer 376. For example, slave controller 380 may receive a command from central controller 130 about what the output voltage of DC/DC power stage 320 should be and may determine, based on the received command, a setting of digital potentiometer 376 that will cause digital potentiometer 376 to exhibit a resistance to cause the input signal of error amplifier 350, and in turn the output of pulse width modulator 340, to cause DC/DC power stage 320 to generate the commanded output voltage. Slave controller 380 may apply the determined setting to digital potentiometer 376.

Although FIG. 3 shows example components of power supply 210, in other implementations, power supply 210 may include fewer components, different components, differently arranged components, or additional components than depicted in FIG. 3. Additionally or alternatively, one or more components of power supply 210 may perform the tasks described as being performed by one or more other components of power supply 210.

Figure 4:
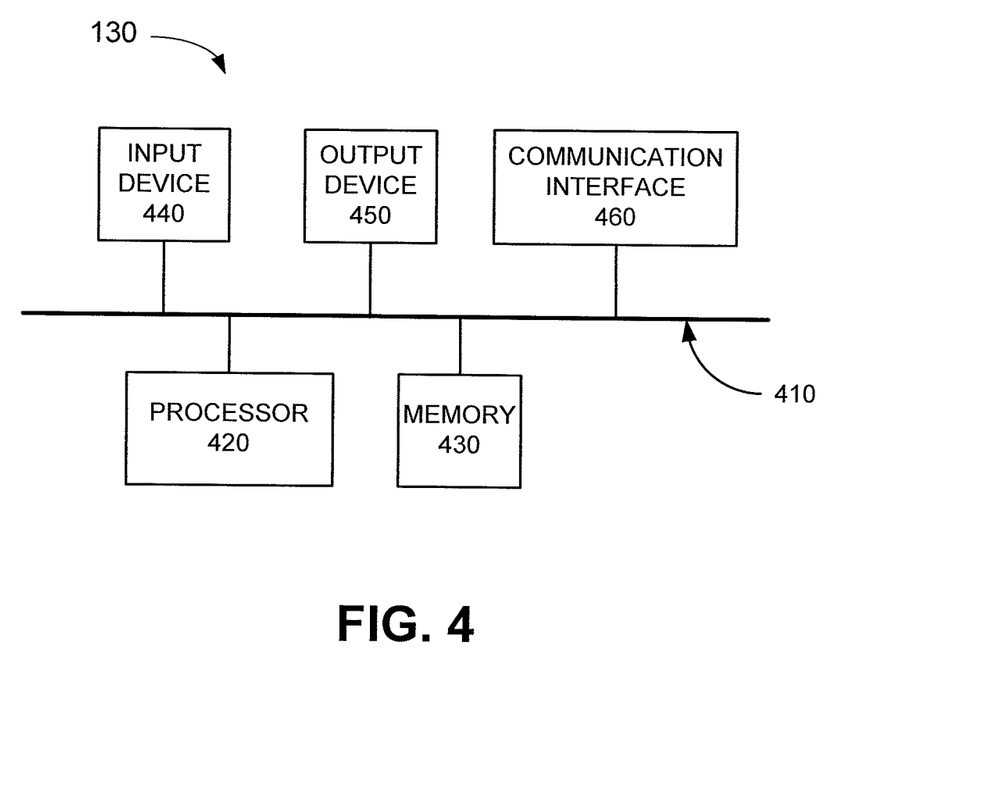
FIG. 4 is a diagram illustrating example components of a central controller according to an implementation described herein.

FIG. 4 is a diagram illustrating example components of central controller 130 according to a first implementation described herein. As shown in FIG. 4, central controller 130 may include a bus 410, a processor 420, a memory 430, an input device 440, an output device 450, and a communication interface 460.

Bus 410 may include a path that permits communication among the components of central controller 130. Processor 420 may include one or more processors, microprocessors, and/or processing logic (e.g., application specific integrated circuits (ASICs) or field programmable gate arrays (FPGAs)) that may interpret and execute instructions. Memory 430 may include a random access memory (RAM) device or another type of dynamic storage device that may store information and instructions for execution by processor 420, a read only memory (ROM) device or another type of static storage device that may store static information and instructions for use by processor 420, a magnetic and/or optical recording memory device and its corresponding drive, and/or a removable form of memory, such as a flash memory.

Input device 440 may include a mechanism that permits an operator to input information to central controller 130, such as a keypad, a button, a pen, a touch screen, voice recognition and/or biometric mechanisms, etc. Input device 440 may be remotely located from central controller 130, such as being located on a front panel of rack system 100 (not shown in FIG. 1). Output device 450 may include a mechanism that outputs information to the operator, including one or more light indicators, a display, a speaker, etc. Output device 450 may be remotely located from central controller 130, such as being located on a front panel of rack system 100 (not shown in FIG. 1).

Communication interface 460 may include any transceiver-like mechanism that enables central controller 130 to communicate with other devices and/or systems. For example, communication interface 360 may include a modem, a network interface card, and/or a wireless interface card.

As will be described in detail below, central controller 130 may perform certain operations. Central controller 130 may perform these operations in response to processor 420 executing software instructions stored in a computer-readable medium, such as memory 430. A computer-readable medium may be defined as a non-transitory memory device. A memory device may include space within a single physical memory device or spread across multiple physical memory devices.

The software instructions may be read into memory 430 from another computer-readable medium, or from another device via communication interface 460. The software instructions stored in memory 430 may cause processor 420 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of central controller 130, in other implementations, central controller 130 may store fewer components, different components, additional components, or differently arranged components than depicted in FIG. 4. Additionally or alternatively, one or more components of central controller 130 may perform one or more tasks described as being performed by one or more other components of central controller 130. For example, in one example, central controller 130 may include a single computer chip (e.g., an ASIC or an FPGA) that includes bus 410, processor 420, and memory 430 and may not necessarily include input device 440, output device 450, or communication interface 460. In another example, central controller 130 may include multiple computer chips and/or other electronic components and may include one or more of input device 440, output device 450, and/or communication interface 460.

Figure 5A:
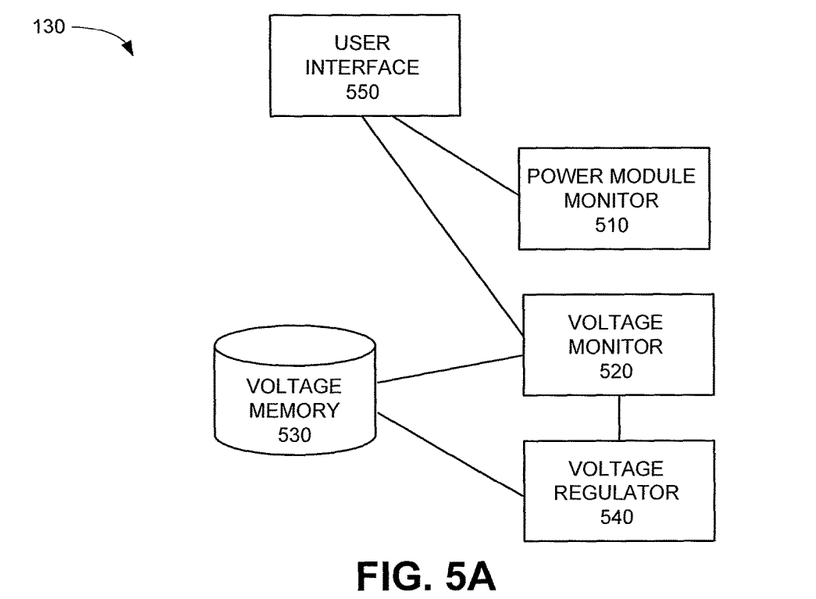
FIG. 5A is a diagram illustrating example functional components of a central controller according to an implementation described herein.

FIG. 5A is a diagram illustrating example functional components of central controller 130 according to an implementation described herein. As shown in FIG. 5A, central controller 130 may include a power module monitor 510, a voltage monitor 520, a voltage memory 530, a voltage regulator 540, and a user interface 550.

Power module monitor 510 may monitor power module 110 to determine whether power module 110 is operating properly. For example, power module monitor 510 may determine whether all power supplies 210 are outputting a signal. If power module monitor 510 detects that a particular power supply 210 is not operating properly, power module monitor 510 may cause user interface 550 to generate an error message. Power module monitor 510 may further determine whether power module 110 includes power supplies capable of operating at a new voltage (e.g., dual range voltage power supplies) and may cause user interface 550 to generate an alarm message if the power module 110 does not include power supplies capable of operating at a new voltage. Power module monitor 510 may also determine whether there are enough power supplies installed in power module 110 to power a load associated with rack system 100.

Figure 5B:
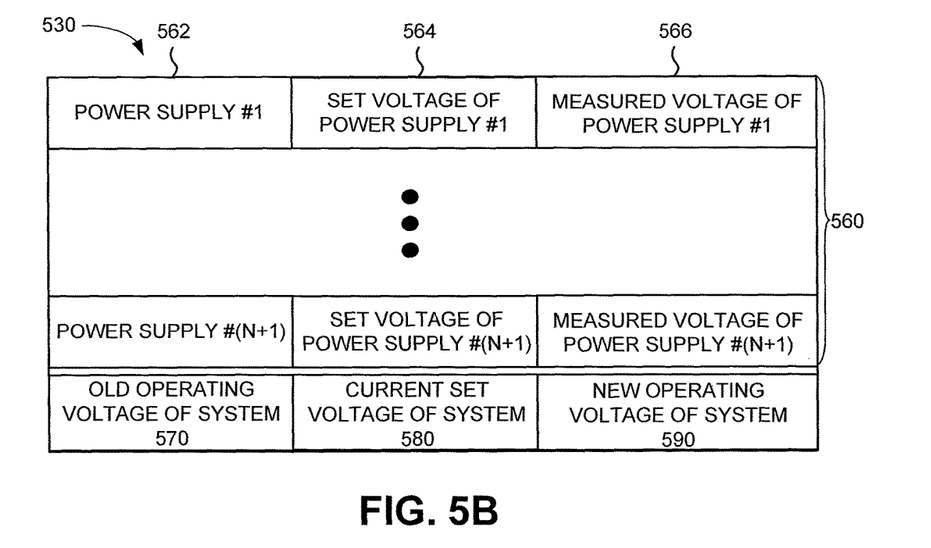
FIG. 5B is a diagram illustrating example components of a voltage table according to an implementation described herein.

Voltage monitor 520 may monitor an output voltage associated with each power supply 210 of power module 110. For example, voltage monitor 520 may periodically poll power supplies 210 for an output voltage and may record a measured output voltage, associated with a particular power supply 210, in measured voltage of power supply entry 566, associated with the particular power supply 210, in voltage table 560. Voltage monitor 520 may also maintain information about the current operating voltage of rack system 100 (e.g., whether rack system 100 is operating at an old voltage (e.g., 48 V) or whether rack system 100 is operating at a new voltage (e.g., 58 V)).

Voltage memory 530 may store information about voltages associated with rack system 110 and/or voltages associated with particular power supplies 210. Example entries that may be stored in voltage table 530 are described below with reference to FIG. 5B.

Voltage regulator 540 may command power supplies 210 to operate at a particular voltage. For example, voltage regulator 540 may set an operating voltage of power supplies 210 in discrete steps, at particular intervals, from an old operating voltage to a new operating voltage. For example, if rack system 100 is to be upgraded from 48 V to 58 V, voltage regulator 540 may set an operating voltage of power supplies 210 from 48 V to 58 V in 0.625 V steps at intervals of 100-300 ms. Other voltage steps and/or time intervals may be alternatively used.

User interface 550 may generate messages in response to receiving particular indications from power module monitor 510 and/or voltage monitor 520 and may provide the generated messages to output device 450. For example, user interface 550 may generate a message indicating that power module 110 is operating properly; may generate a message indicating that power module 110 is not operating properly and/or may indicate a particular power supply 210 of power module 110 that is not operating properly; and/or may indicate that power module 110 includes power supplies that are not able to operate at a new operating voltage.

Although FIG. 5A shows example functional components of central controller 130, in other implementations, central controller 130 may store fewer functional components, different functional components, additional functional components, or differently arranged functional components than depicted in FIG. 5A. Additionally or alternatively, one or more functional components of central controller 130 may perform one or more tasks described as being performed by one or more other functional components of central controller 130.

FIG. 5B shows example entries that may be stored in voltage memory 530. As shown in FIG. 5B, voltage memory 530 may include a voltage table 560, an old operating voltage of system entry 570, a current set voltage of system 580, and a new operating voltage of system entry 590.

Voltage table 560 may include one or more power supply entries 562 (referred to herein collectively as "power supply entries 562" and individually as "power supply entry 562"), one or more set voltage entries 564 (referred to herein collectively as "set voltage entries 564" and individually as "set voltage entry 564") corresponding to particular ones of the one or more power supply entries 562, and one or more measured voltage entries 566 (referred to herein collectively as "measured voltage entries 566" and individually as "measured voltage entry 566") corresponding to the particular ones of the one or more power supply entries 562.

Power supply entry 562 may store information identifying a particular one of power supplies 210. Thus, voltage table 560 may include N+1 power supply entries, one for each of N+1 power supplies. Set voltage entry 564 may store a value corresponding to an output voltage to which the particular one of power supplies 210 has been set by voltage regulator 540. Measured voltage entry 566 may store a value corresponding to a measured output voltage of the particular one of power supplies 210 as measured by voltage monitor 520.

Old operating voltage of system entry 570 may store a value corresponding to an old operating voltage of rack system 100 (e.g., before power module 110 is upgraded). Current set voltage of system entry 580 may store a value, intermediate between the old operating voltage and a new operating voltage, corresponding to a voltage of rack system 100 set by voltage regulator 540 during a ramp up procedure from the old voltage to the new voltage. New operating voltage of system entry 590 may store a value corresponding to a new operating voltage of rack system 100 (e.g., after power module 110 has been upgraded and after the ramping up process has been completed).

Although FIG. 5B shows example entries that may be stored in voltage memory 530, in other implementations, voltage memory 530 may include fewer entries, different entries, additional entries, or differently arranged entries than depicted in FIG. 5B.

Figure 6:
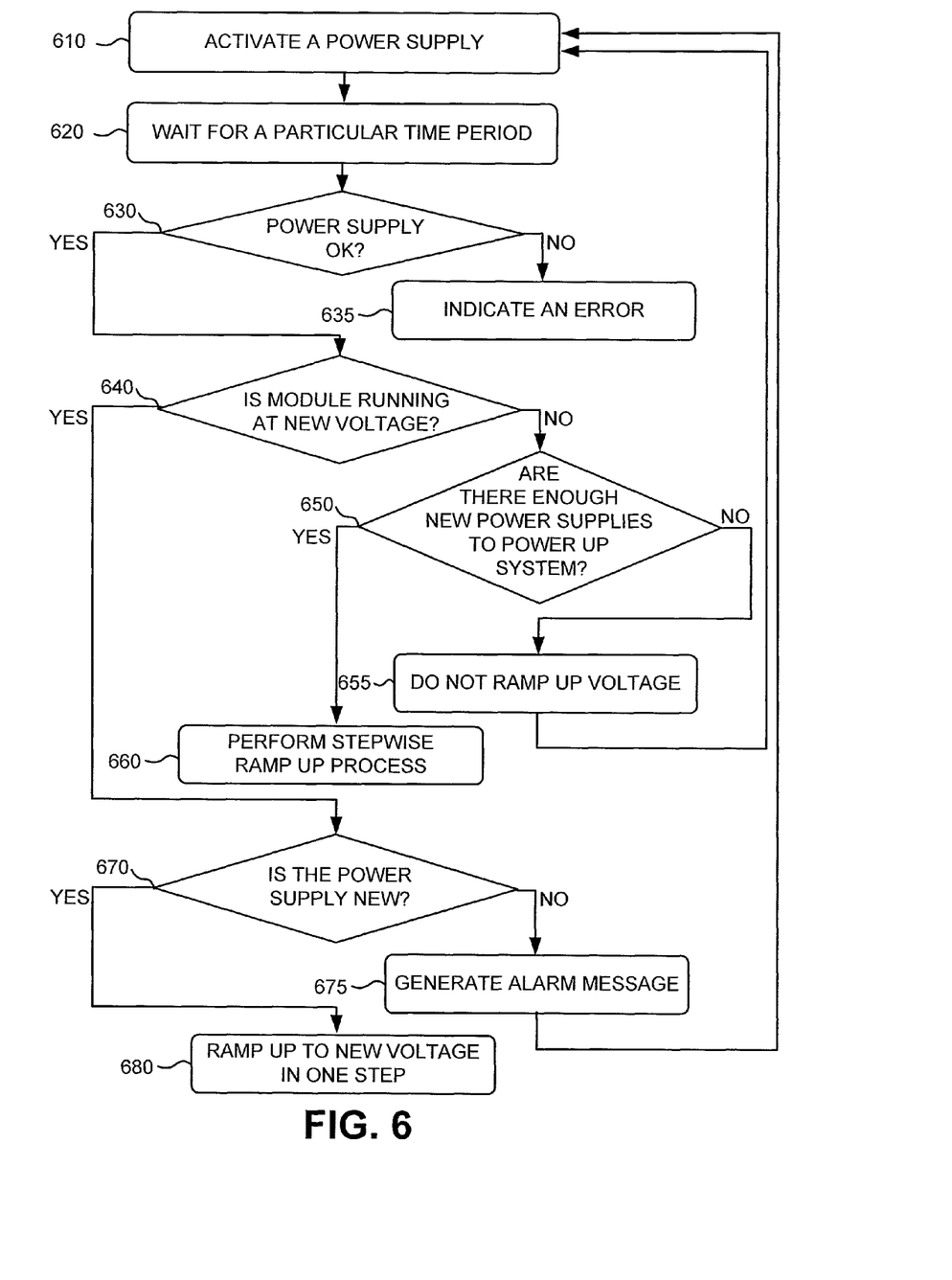
FIG. 6 is a diagram of a flow chart illustrating an example process of upgrading a power module according to an example implementation described herein.

FIG. 6 is a diagram of a flow chart illustrating an example process of upgrading power module 110 according to an implementation described herein. In one implementation, the process of FIG. 6 may be performed by central controller 130. In other implementations, some or all of the process of FIG. 6 may be performed by another device or a group of devices separate and/or possibly remote from or including central controller 130.

The process of FIG. 6 may include activating a power supply (block 610). For example, an operator may indicate, via input device 440, that a power supply 210 has been installed (e.g., that an old power supply, which is not operable at a higher voltage, has been replaced). In another example, voltage monitor 520 may detect that all power supplies included in power module 110 are operable at a new voltage. Voltage monitor 520 may access an identifier stored in a particular one of power supplies 210 to determine whether the identifier corresponds to an identifier associated with a power supply operable at a higher voltage.

Waiting may be performed for a particular time period (block 620). For example, power module monitor 510 may wait for a particular period of time before proceeding to allow power module 110 to stabilize.

A determination may be made whether the power supply is ok (block 630). For example, power module monitor 510 may determine the installed power supply 210 is outputting power. A particular power supply 210 may not be outputting power if the particular power supply 210 is defective or if an electrical connection (e.g., input DC 310, dual range output voltage bus 330, and/or a connection from central controller 130 to power supply 210) has not been connected.

If it is determined that the power supply is not ok (block 630—NO), an error may be indicated (block 635). For example, user interface 510 may send a message to output device 450 indicating that the power supply 210 is not ok. Additionally or alternatively, the message may include information identifying the particular power supply 210 that is not outputting power.

If it is determined that the power supply is ok (block 630—YES), a determination may be made whether the power module is running at a new voltage (block 640). For example, voltage monitor 520 may poll power supplies 210 to measure voltages outputted by power supplies 210 and may store the measured voltages in voltage table 560. Voltage regulator 540 may compare the measured voltages from voltage table 560 with new operating voltage of system entry 590 to determine whether the measured voltages match the new voltage.

If it is determined that the power module is running at the new voltage (block 640—YES), a determination may be made as to whether the power supply is new (block 670). For example, power module monitor 510 may access an identifier stored in the power supply 210 to determine whether the identifier corresponds to an identifier associated with a power supply operable at a higher voltage.

If it is determined that the power supply is new (block 670—YES), the voltage may be ramped up to the new voltage in one step (block 680). Since the power module is already running at the new voltage (as determined in block 640), there may be no need to ramp up one step at a time and voltage regulator 540 may ramp up power supply 210 to the new voltage in one step. Additionally, voltage regulator 540 may store a value in set voltage of power supply entries 564, associated with power supply 210, corresponding to a value stored in new operating voltage of system entry 590.

If it is determined that the power supply is not new (block 670—NO), an alarm message may be generated (block 675). Since power supply 210 is not new, power supply 210 may not be operable at the new voltage. Therefore, power supply 210 would be operating at a voltage (as determined in block 640) that is not supported, if a ramp up process were to be performed. Power module monitor 510 may cause user interface 550 to generate an alarm message and user interface 550 may, via output device 450, display the alarm message. Processing may return to block 610 to await activation of another power supply.

Returning to block 640, if it is determined that the power module is not running at the new voltage (block 640—NO), a determination may be made as to whether there are enough new power supplies to power up the system (block 650). For example, power module monitor 510 may determine whether a number of power supplies installed in power module 110 corresponds to a number of entries in voltage table 560.

If it is determined that there are enough power supplies to power up the system (block 650—YES), a stepwise ramp up process may be performed (block 660). The stepwise ramp up process is described below with reference to FIG. 7. If it is determined that there are not enough power supplies to power up the system (block 650—NO), voltage may not be ramped up (block 655). For example, voltage regulator 540 may not ramp up the voltage of power module 110 to a new voltage, as the installed power supplies may not be sufficient to run rack system 100 at the new voltage. Voltage regulator 540 may instruct user interface 550 to generate an error message indicating that there are not enough power supplies installed in power module 110 to run rack system 100 at a new voltage. Processing may return to block 610 to await activation of another power supply (e.g., after additional power supplies have been installed).

Figure 7:
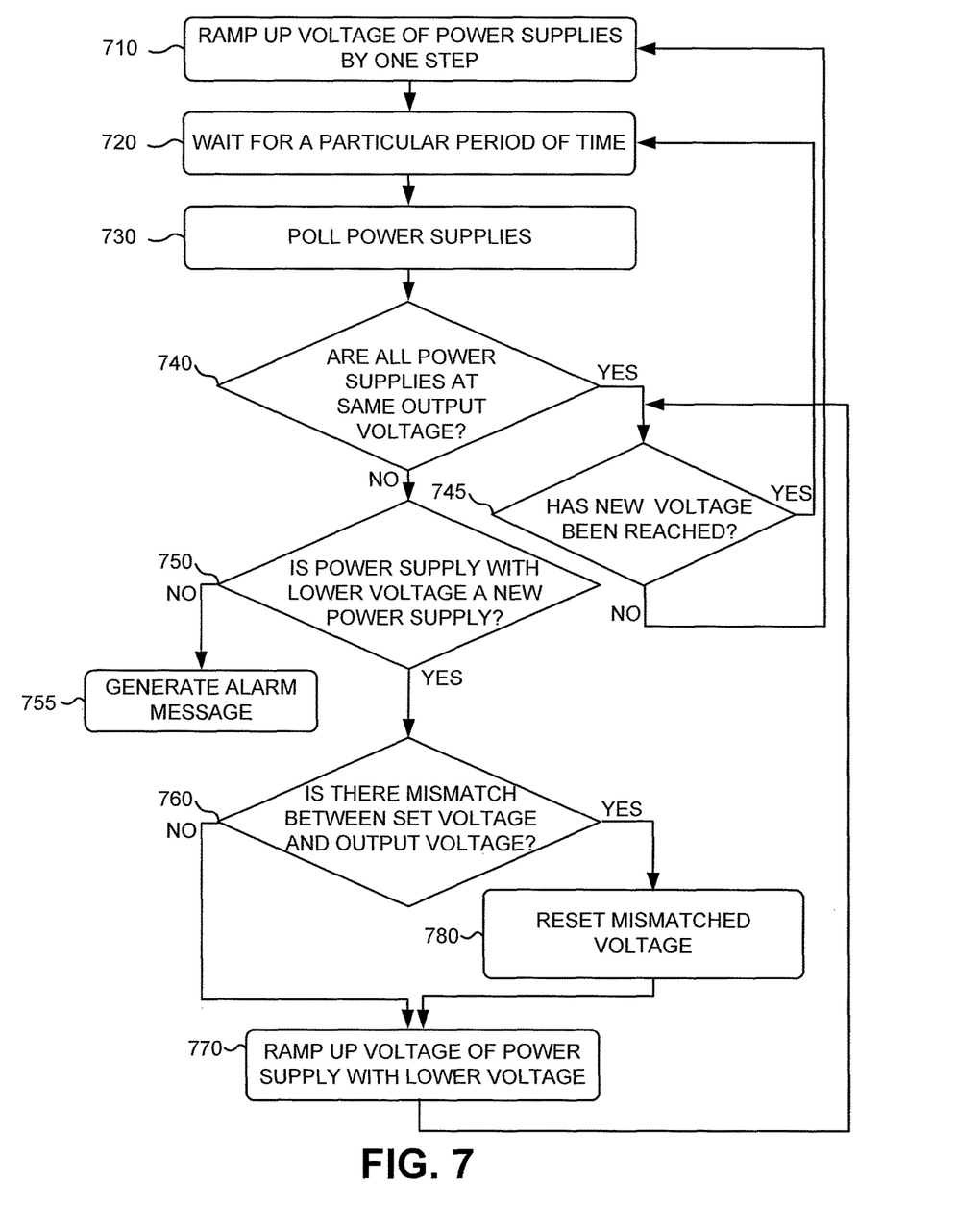
FIG. 7 is a diagram of a flow chart illustrating an example process for ramping up voltage of a power module according to an implementation describe herein.

FIG. 7 is a diagram of a flow chart illustrating an example process of ramping up voltage of power module 110 according to an implementation described herein. In one implementation, the process of FIG. 7 may be performed by central controller 130. In other implementations, some or all of the process of FIG. 7 may be performed by another device or a group of devices separate and/or possibly remote from or including central controller 130.

The process of FIG. 7 may include ramping up voltage of power supplies by one step (block 710). For example, voltage regulator 540 may increase a value stored in current set voltage of system entry 580 by a step voltage. In one example, the selected step voltage may be set less than a threshold value (e.g., less than one volt), where the threshold value is selected so that instabilities caused in power module 110 (e.g., caused by inaccuracies in voltage set points of multiple power supplies 210), during a ramp up by the threshold value, will not cause over-current protection to be activated in rack system 100. For example, the step voltage may be selected so that, based on empirical measurements, over-current protection will be activated in less than a particular percentage of instances, when using the selected step voltage. In another example, the selected step voltage may be set based on a difference between the old voltage and the new voltage and based on a particular number of steps.

Central controller 130 may send a signal to slave controllers 380 of all power supplies 210 in power module 110 to increase the output voltage of all power supplies 210 by the step voltage to the value stored in current set voltage of system entry 580. In an example where an old voltage corresponds to 48 V and a new voltage corresponds to 58 V, and where the ramp up process is to occur in 16 discrete steps, voltage regulator 540 may select a voltage step of 0.625 V.

Waiting may be performed for a particular period of time (block 720). For example, voltage monitor 520 may wait for a particular period of time after the voltage has been ramped up before polling for the output voltage associated with particular power supplies 210. Voltage monitor 520 may wait for a first period of time if the ramp up process has not been completed and may wait for a second period of time if the ramp up process has been completed and voltage monitor 520 is performing maintenance polling (see description of block 745 below). For example, voltage monitor 520 may wait for 300 ms if the ramp up process is in progress, and may wait 4-5 seconds if the ramp up process has been completed and voltage monitor 520 is performing maintenance polling.

The power supplies may be polled (block 730). For example, voltage monitor 520 may measure the output voltage of each power supply 210 and may store the measured voltage values in voltage table 560. A determination may be made as to whether all power supplies are at the same output voltage (block 740). For example, voltage regulator 540 may access voltage memory 530 to determine whether all power supplies 210 are operating at the same voltage (e.g., within a particular voltage range that may be smaller than the voltage step).

If it is determined that all power supplied are at the same output voltage (block 740—YES), a determination may be made as to whether the new voltage has been reached (block 745). For example, voltage regulator 540 may determine whether the measured voltage corresponds to the new output voltage.

If it is determined that the new voltage has been reached (block 745—YES), processing may return to block 720 to wait for a particular period of time. If the new voltage has been reached, this may indicate that the ramp up process has been completed and that rack system 100 is operating at the new voltage. After a ramp up process is completed and rack system 100 is operating at a new voltage, central controller 130 may perform maintenance polling by continuing to poll power module 110, while rack system 100 is in operation, to ensure that all power supplies 210 are operating at the new voltage. For example, an operator may remove or add a line card and/or fabric card, leading to a power cable being connected or disconnected, which may result in instability of the output voltage. Therefore, central controller 130 may periodically poll power supplies 210 to check for instabilities in output voltage.

If it is determined that the new voltage has not been reached (block 745—NO), processing may return to block 710 to ramp up the voltage by another step. For example, central controller 130 may send a signal to slave controller 380 of all the power supplies 210 in power module 110 to increase the output voltage by another step.

Returning to block 740, if it is determined that all power supplied are not at the same output voltage (block 740—NO), a determination may be made as to whether a power supply with a lower voltage is a new power supply (block 750). For example, voltage monitor 520 may identify a particular power supply 210 associated with a lower output voltage (e.g., by accessing voltage table 560) and may access an identifier stored in the particular power supply 210. Voltage monitor 520 may determine whether the stored identifier corresponds to an identifier associated with a power supply operable at a higher voltage.

If it is determined that the power supply with the lower voltage is not a new power supply (block 750—NO), an alarm message may be generated (block 755). Voltage monitor 520 may indicate to user interface 550 to generate an alarm message and user interface 550 may, via output device 450, generate an alarm message indicate that the particular power supply is not capable of operating at the higher voltage and that the particular power supply needs to be replaced.

If it is determined that the power supply with the lower voltage is a new power supply (block 750—YES), a determination may be made as to whether there is a mismatch between a set voltage and an output voltage associated with the particular power supply (block 760). For example, voltage regulator 540 may compare a value stored in set voltage of power supply entry 564, associated with the particular power supply, with a value stored in measured voltage of power supply entry 566, associated with the particular power supply.

If it is determined that there is no mismatch between the set voltage and the output voltage (block 760—NO), the voltage of the particular power supply, associated with the lower voltage, may be ramped up (block 770). For example, voltage regulator 540 may ramp up the voltage of the particular power supply to the set voltage. Processing may continue to block 745.

If it is determined that there is a mismatch between the set voltage and the output voltage (block 760—YES), the set voltage may be reset. For example, voltage regulator 540 may set the voltage of the particular power supply to a same value as the output voltage associated with other power supplies of power module 110 (e.g., by retrieving a value stored in current set voltage of system field 580 of voltage memory 530 and setting the set voltage of power supply entry, associated with the particular power supply, to the retrieved value). Processing may continue to block 770.

If more than one power supply is identified as operating at a lower voltage, blocks 750 through 770 may be performed for each power supply identified by voltage monitor 520 as operating at a lower voltage.

CONCLUSION

The foregoing description provides illustration and description, but is not intended to be exhaustive or to limit the invention to the precise form disclosed. Modifications and variations are possible in light of the above teachings or may be acquired from practice of the invention.

While examples were described with respect to a load that includes line cards and/or fabric cards installed on a chassis frame, with a central controller installed on a backplane of the chassis frame, other implementations may include a different type of system and/or a different type of load. The implementations described herein may be implemented in any electrical system with N+1 power supplies, where the electrical system is to be upgraded from a first voltage to a second voltage without interrupting operation of the electrical system (e.g., without triggering over-current protection).

While a series of blocks has been described with respect to FIGS. 6 and 7, the order of the blocks may be modified in other implementations. Further, non-dependent blocks may be performed in parallel.

Also, certain portions of the implementations may have been described as a "component," "monitor," "regulator," or "interface" that performs one or more functions. The "component," "monitor," "regulator," and "interface" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed:

1. A system comprising:
   a power module comprising a plurality of power supplies that are connected,
      one or more power supplies, of the plurality of power supplies, being operable at a plurality of voltages; and
   a controller, coupled to the one or more power supplies, to:
      determine, while the system is operating at a first voltage and after one or more other power supplies are replaced with the one or more power supplies, that the plurality of power supplies are sufficient to run the system at a second voltage; and
      ramp up, based on determining that the plurality of power supplies are sufficient to run the system at the second voltage, an output voltage, associated with the plurality of power supplies, from the first voltage to the second voltage in a plurality of steps,
         the first voltage being greater than zero volts,
         each of the plurality of steps being less than one volt, and
         ramping up, based on determining that the plurality of power supplies are sufficient to run the system at the second voltage, the output voltage by a particular step, of the plurality of steps, being performed while a load is receiving power from the plurality of power supplies.

2. The system of claim 1, where the load includes one or more line cards installed in a chassis frame or one or more fabric cards installed in the chassis frame.

3. The system of claim 2, where the controller is installed on one of:
   a backplane of the chassis frame,
   a line card installed in the chassis frame, or
   a fabric card installed in the chassis frame.

4. The system of claim 1, where
   the plurality of power supplies includes N+1 active power supplies, and
   an active power supply, of the N+1 active power supplies, is redundant.

5. The system of claim 1, where a power supply, of the plurality of power supplies, includes:
   a direct current (DC) power stage to convert an input DC voltage into an output DC voltage;
   a resistive divider, coupled to the DC power stage, to control the output DC voltage,
      where the resistive divider includes a digital potentiometer; and
   a slave controller to:
      receive a command from the controller,
         the command specifying the output DC voltage;
      determine a setting of the digital potentiometer based on the received command; and
      set the digital potentiometer to the determined setting.

6. The system of claim 5, where the power supply, of the plurality of power supplies, further comprises:
   an alternating current (AC) to DC converter coupled with the DC power stage to convert an input AC voltage into an output DC voltage;
   a pulse width modulator, coupled to the DC power stage, to control the output DC voltage of the DC power stage, the pulse width modulator to:
      receive an input from a sawtooth wave generator;
      receive an input from an error amplifier,
         the error amplifier taking as an input a combination of a signal taken from the resistive divider and a compensation circuit; and
      combine the inputs from the sawtooth wave generator and the error amplifier to generate a pulse signal,
         where a duty cycle of the pulse signal is proportional to an output voltage generated by the error amplifier.

7. The system of claim 1, where the controller, when ramping up the output voltage from the first voltage to the second voltage, is further to:
   instruct the power module to ramp up the output voltage by a step voltage;
   wait, based on instructing the power module to ramp up the output voltage by the step voltage, for a particular length of time;
   determine, after the particular length of time, whether all of the plurality of power supplies are outputting a same voltage;
   determine, when the plurality of power supplies are outputting the same voltage, whether the second voltage has been reached; and
   instruct, when the second voltage has not been reached, the power module to ramp up the output voltage by another step voltage.

8. The system of claim 7, where the controller is further to:

identify, when all of the plurality of power supplies are not outputting the same voltage, a power supply, of the plurality of power supplies, associated with an output voltage that is less than an output voltage associated with another power supply of the plurality of power supplies; and ramp up the output voltage of the identified power supply to match an output voltage associated with at least one other power supply of the plurality of power supplies.

9. The system of claim 1, where the controller is further to:

poll, when the power module is outputting the second voltage, the plurality of power supplies at particular intervals to determine whether all of the plurality of power supplies are outputting a same voltage.

10. A method comprising:

determining, by a device, that an output voltage, associated with a plurality of power supplies that are connected, is at a first voltage,
  one or more power supplies, of the plurality of power supplies, being operable at a plurality of voltages, and
  the plurality of power supplies being associated with a power module;

determining, by the device, while a system is operating at the first voltage, and after one or more other power supplies are replaced with the one or more power supplies, that the plurality of power supplies are sufficient to run the system at a second voltage; and ramping up, by the device, based on determining that the output voltage is at the first voltage, and based on determining that the plurality of power supplies are sufficient to run the system at the second voltage, the output voltage to the second voltage in a plurality of steps,
  the first voltage being greater than zero volts,
  each of the plurality of steps being less than one volt, and
  ramping up, based on determining that the plurality of power supplies are sufficient to run the system at the second voltage, the output voltage by a particular step, of the plurality of steps, being performed while a load is receiving power from the plurality of power supplies.

11. The method of claim 10, where the plurality of power supplies includes N+1 active power supplies, and an active power supply, of the N+1 active power supplies, is redundant.

12. The method of claim 10, where, when ramping up the output voltage from the first voltage to the second voltage, the method includes:

instructing the power module to ramp up the output voltage by a step voltage;

waiting, based on instructing the power module to ramp up the output voltage by the step voltage, for a particular length of time;

determining, after the particular length of time, whether all of the plurality of power supplies are outputting a same voltage;

determining, when the plurality of power supplies are outputting the same voltage, whether the second voltage has been reached; and instructing, when the second voltage has not been reached, the power module to ramp up the output voltage by another step voltage.

13. The method of claim 12, further comprising:

identifying, when all of the plurality of power supplies are not outputting the same voltage, a power supply, of the plurality of power supplies, associated with an output voltage that is less than an output voltage associated with another power supply of the plurality of power supplies; and ramping up the output voltage of the identified power supply to match an output voltage associated with at least one other power supply of the plurality of power supplies.

14. The method of claim 10, further comprising:

polling, when the power module is outputting the second voltage, the plurality of power supplies at particular intervals to determine whether all of the plurality of power supplies are outputting a same voltage.

15. The method of claim 10, further comprising:

determining that a particular power supply, of the plurality of power supplies, is not operating properly;

generating an error message indicating that the particular power supply is not operating properly; and providing, for display in a user interface, the error message.

16. A non-transitory computer-readable medium storing instructions, the instructions comprising:

one or more instructions which, when executed by a processor, cause the processor to:
  determine that an output voltage, associated with a plurality of power supplies that are connected, is at a first voltage,
    one or more power supplies, of the plurality of power supplies, being operable at a plurality of voltages, and
    the plurality of power supplies being associated with a power module;
  determine, while a system is operating at the first voltage and after one or more other power supplies are replaced with the one or more power supplies, that the plurality of power supplies are sufficient to run the system at a second voltage; and
  ramp up, based on determining that the output voltage is at the first voltage and based on determining that the plurality of power supplies are sufficient to run the system at the second voltage, the output voltage from the first voltage to the second voltage in a plurality of steps,
    the first voltage being greater than zero volts,
    each of the plurality of steps being less than one volt, and,
    ramping up, based on determining that the plurality of power supplies are sufficient to run the system at the second voltage, the output voltage by a particular step, of the plurality of steps, being performed while a load is receiving power from the plurality of power supplies.

17. The non-transitory computer-readable medium of claim 16, where the one or more instructions to ramp up the output voltage from the first voltage to the second voltage include:

one or more instructions to instruct the power module to ramp up the output voltage by a step voltage;

one or more instructions to wait, based on instructing the power module to ramp up the output voltage by the step voltage, for a particular length of time;

one or more instructions to determine, after the particular length of time, whether all of the plurality of power supplies are outputting a same voltage;

one or more instructions to determine, when the plurality of power supplies are outputting the same voltage, whether the second voltage has been reached; and one or more instructions to instruct, when the second voltage has not been reached, the power module to ramp up the output voltage by another step voltage.

18. The non-transitory computer-readable medium of claim 17, where the instructions further include:

one or more instructions to identify, when all of the plurality of power supplies are not outputting the same voltage, a power supply, of the plurality of power supplies, associated with an output voltage that is less than an output voltage associated with another power supply of the plurality of power supplies; and one or more instructions to ramp up the output voltage of the identified power supply to match an output voltage associated with at least one other power supply of the plurality of power supplies.

19. The non-transitory computer-readable medium of claim 17, where the instructions further include:

one or more instructions to determine that a particular power supply, of the plurality of power supplies, is not operating properly;

one or more instructions to generate an error message indicating that the particular power supply is not operating properly; and one or more instructions to provide, for display, the error message.

20. The non-transitory computer-readable medium of claim 16, where the instructions further include:

one or more instructions to poll, when the power module is outputting the second voltage, the plurality of power supplies at particular intervals to determine whether all of the plurality of power supplies are outputting a same voltage.

\* \* \* \* \*